(12) United States Patent
Mildner

(10) Patent No.: US 8,757,708 B2
(45) Date of Patent: Jun. 24, 2014

(54) MOTOR VEHICLE BODY HAVING STRUCTURE-REINFORCING FRONT FRAME ATTACHMENT

(75) Inventor: Udo Mildner, Limburg (DE)

(73) Assignee: GM Global Technology Operations LLC, Detroit, MI (US)

(*) Notice: Subject to any disclaimer, the term of this patent is extended or adjusted under 35 U.S.C. 154(b) by 158 days.

(21) Appl. No.: 13/214,327

(22) Filed: Aug. 22, 2011

(65) Prior Publication Data

US 2012/0043785 A1 Feb. 23, 2012

(30) Foreign Application Priority Data

Aug. 20, 2010 (DE) .......................... 10 2010 034 932

(51) Int. Cl.
*B62D 25/08* (2006.01)
(52) U.S. Cl.
USPC ............ 296/203.02; 296/187.09; 296/193.09; 296/29
(58) Field of Classification Search
USPC ............. 296/187.09, 193.09, 193.02, 203.02, 296/29, 30, 198
See application file for complete search history.

(56) References Cited

U.S. PATENT DOCUMENTS

| | | | | |
|---|---|---|---|---|
| 4,078,840 A | * | 3/1978 | Itoh | 296/192 |
| 4,699,419 A | * | 10/1987 | Kawase et al. | 296/192 |
| 4,804,222 A | * | 2/1989 | Sakiyama et al. | 296/203.02 |
| 5,011,201 A | * | 4/1991 | Takahashi et al. | 296/203.02 |
| 5,713,625 A | * | 2/1998 | Takahashi et al. | 296/204 |
| 5,874,891 A | | 2/1999 | Lowe | |
| 6,145,923 A | * | 11/2000 | Masuda | 296/1.03 |
| 6,209,950 B1 | * | 4/2001 | Hanyu | 296/203.02 |
| 6,270,151 B1 | | 8/2001 | Sato | |
| 6,299,240 B1 | * | 10/2001 | Schroeder et al. | 296/203.01 |
| 6,460,918 B1 | * | 10/2002 | Sato et al. | 296/204 |
| 6,547,318 B2 | * | 4/2003 | Takeuchi | 296/204 |
| 6,817,657 B2 | * | 11/2004 | Watanabe et al. | 296/203.02 |
| 6,857,691 B2 | * | 2/2005 | Kuroda et al. | 296/203.02 |
| 6,908,146 B2 | * | 6/2005 | Tomita | 296/203.02 |
| 2002/0149207 A1 | | 10/2002 | Bromhall | |

(Continued)

FOREIGN PATENT DOCUMENTS

DE 3622188 A1 1/1987
DE 4414472 A1 11/1995

(Continued)

OTHER PUBLICATIONS

British Patent Office, British Search Report for Application No. 1113558.9, dated Dec. 2, 2011.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A motor vehicle body is provided having a front wall structure and having at least one lateral longitudinal girder, at least regionally situated in front of the front wall structure in the travel direction of the vehicle, and having a reinforcement element, which is connected to the front wall structure and to the longitudinal girder, the longitudinal girder and the reinforcement element, in a connection section lying in front of the front wall structure in the travel direction, being at least partially overlapping viewed in the vehicle transverse direction and being directly connected to one another.

14 Claims, 7 Drawing Sheets

(56) References Cited

U.S. PATENT DOCUMENTS

| | | |
|---|---|---|
| 2005/0231337 A1 | 10/2005 | Tourneur et al. |
| 2010/0084891 A1 | 4/2010 | Mildner |
| 2012/0043785 A1 * | 2/2012 | Mildner ................ 296/193.02 |

FOREIGN PATENT DOCUMENTS

| | | |
|---|---|---|
| DE | 10001102 A1 | 7/2001 |
| DE | 10316205 A1 | 11/2003 |
| DE | 10338389 A1 | 3/2005 |
| DE | 102005034468 A1 | 2/2007 |
| DE | 102007041701 A1 | 3/2009 |
| DE | 102007042928 A1 | 3/2009 |
| DE | 102008003645 A1 | 7/2009 |
| DE | 102008049763 A1 | 4/2010 |
| DE | 102009004886 A1 | 7/2010 |
| DE | 102009049113 A1 | 4/2011 |
| EP | 0908371 A2 | 4/1999 |
| EP | 1083119 A2 | 3/2001 |
| EP | 1093995 A2 | 4/2001 |
| EP | 1209068 A2 | 5/2002 |
| GB | 2329928 A | 4/1999 |
| GB | 2457580 A | 8/2009 |

OTHER PUBLICATIONS

German Patent Office, German Search Report for Application No. 102010034932.1, dated Jun. 9, 2011.

* cited by examiner

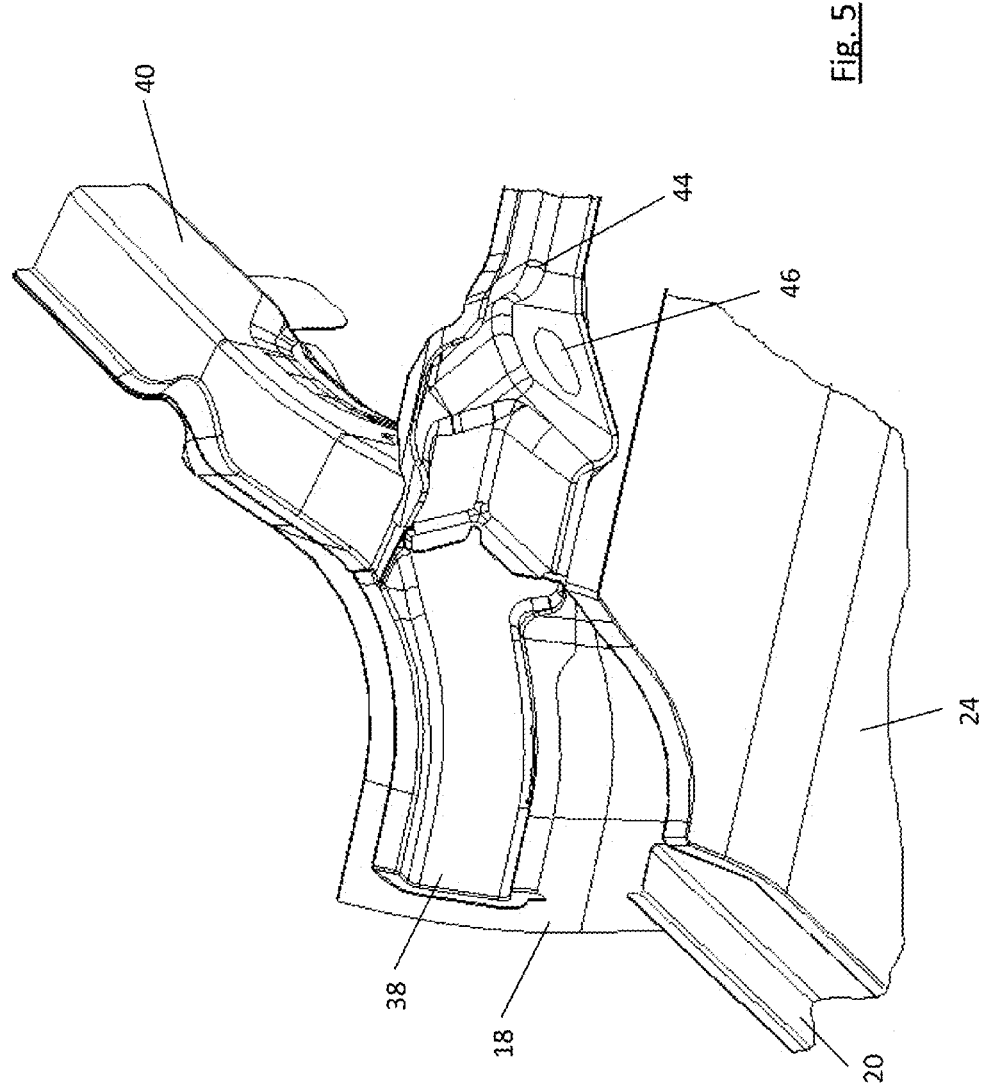

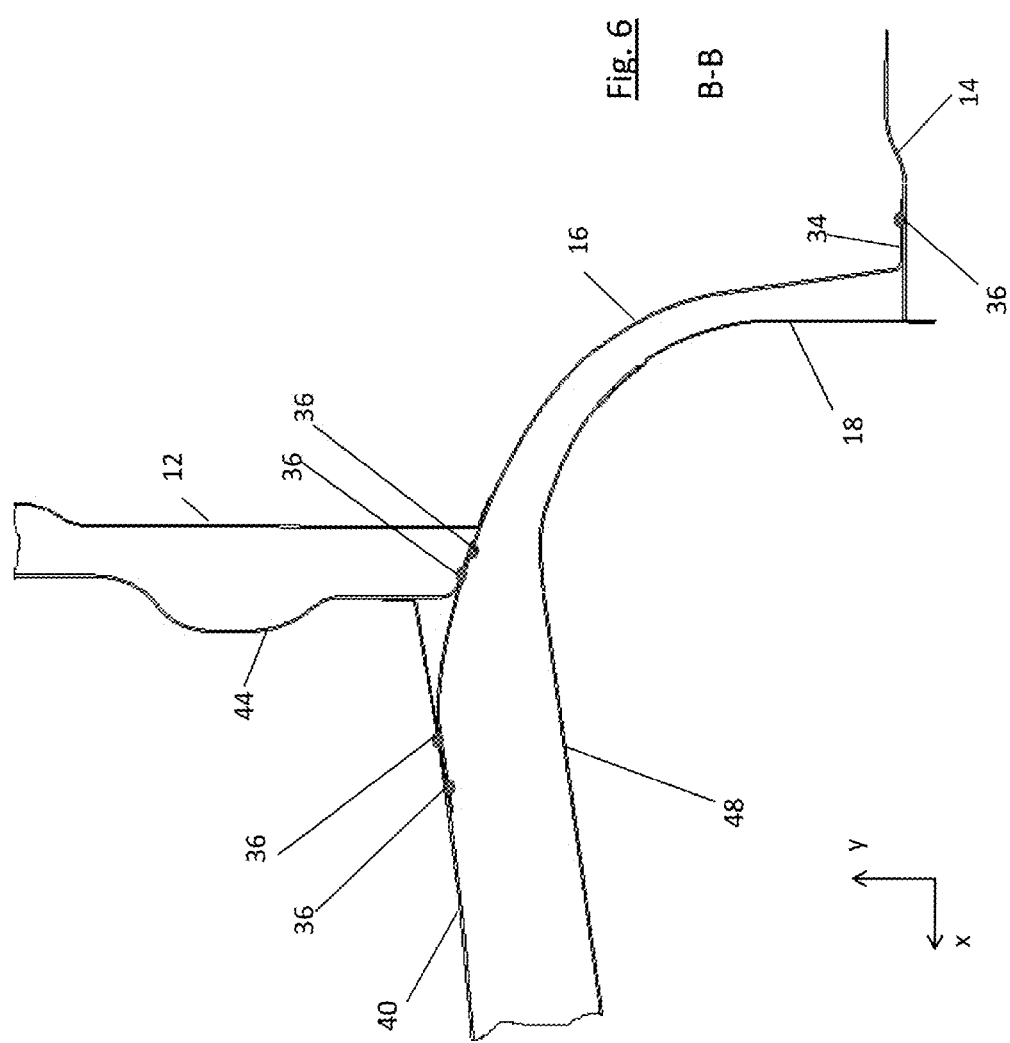

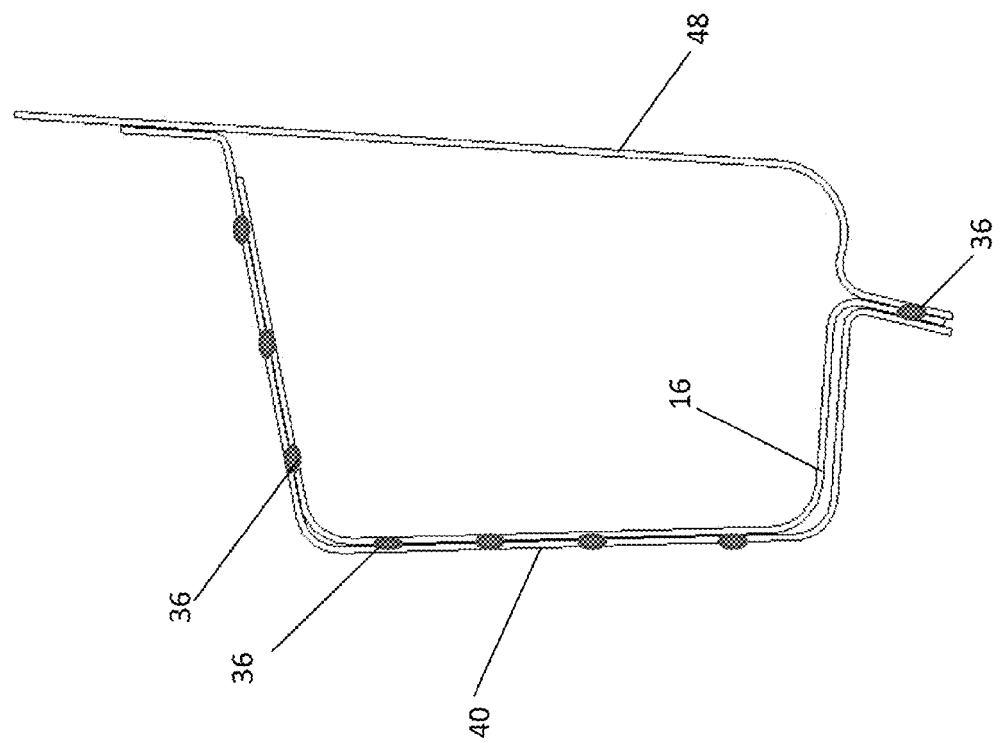

MOTOR VEHICLE BODY HAVING STRUCTURE-REINFORCING FRONT FRAME ATTACHMENT

CROSS-REFERENCE TO RELATED APPLICATION

This application claims priority to German Patent Application No. 102010034932.1, filed Aug. 20, 2010, which is incorporated herein by reference in its entirety.

TECHNICAL FIELD

The technical field relates to a motor vehicle body and in particular a vehicle body front structure having structure-reinforcing means in the transition area of front frame and vehicle front wall.

BACKGROUND

A motor vehicle body typically has a front frame, located in front of the passenger compartment, having longitudinal girders extending laterally and essentially in the vehicle longitudinal direction, which are to be structurally connected, in the area of a front wall separating the passenger compartment and the engine compartment, to a front wall crossbeam, a lateral front wall plate, and/or side sills extending essentially in the vehicle longitudinal direction.

Furthermore, a wheel housing or a wheel well is provided in this transition area. The wheel housing is typically curved inward. For the structural reinforcement of the front frame attachment, a reinforcement structure, for example, in the form of a reinforcement plate adapted to the contour of the wheel housing or the front wall plate, is often to be provided.

Thus, for example, a reinforcement plate having two sections is known from DE 100 01 102 A1, which, viewed from the passenger compartment, is situated below the floor plate and the front wall. The reinforcement plate has its first section running in a complementary manner below a transversely running front wall section in this case. A second section extends horizontally under the floor plate.

The vehicle body front structure can have a longitudinal girder on each vehicle side in this case, which forks into an inner longitudinal girder element and an outer longitudinal girder element below the floor plate. While the outer longitudinal girder element is connected to a side sill profile, the second section of the reinforcement plate extends in the transverse direction from the outer longitudinal girder element to the inner longitudinal girder element and is welded to both of them.

Further known embodiments of reinforcement structures on the front wall side provide, for example, situating a reinforcement plate on the inner side of a front wall structure facing toward the passenger compartment and connecting the lateral longitudinal girder from the opposing outer side to the front wall in the area of this material doubling. The reinforcement plate, which extends over the inwardly curved wheel housing and the front wall adjoining thereon, which runs essentially in the vehicle transverse direction, forms, together with the front wall, a material doubling to receive or fasten a front wall crossbeam and/or a front frame.

In the transition area from wheel housing to adjoining front wall, which can also be implemented integrally with the wheel housing plate, the reinforcement plate is comparatively strongly curved because of the geometrical design. Bending angles of up to 90° having bending radii in the millimeter range or in the single-digit centimeter range are certainly implemented in this case. Such bends and bending radii necessarily represent a weak point of vehicle body with regard to structural and torsional stiffness in case of load. Such reinforcement plates are accordingly to be implemented as comparatively thick-walled, or are to be manufactured from comparatively strong materials, which is at the expense of the vehicle weight and/or the production costs.

It is therefore at least one object to provide an improved reinforcement structure for the front frame attachment in the area of a motor vehicle front wall structure, which provides the vehicle body with increased structural and torsional stiffness. At least a further object is the reduction of the vehicle weight and the material expenditure, so that the fuel consumption and the production costs of the vehicle may be reduced. At least another object is to provide the motor vehicle with improved crash behavior and in particular reduce a front wall intrusion, which is oriented inward toward the passenger compartment, as a result of external force introduction.

SUMMARY

The motor vehicle body has a front wall structure, which separates the passenger compartment and the engine compartment, and at least one lateral longitudinal girder of a front frame, which is situated at least regionally in front of the front wall structure in the travel direction of the vehicle or in the vehicle longitudinal direction. Furthermore, a reinforcement element is provided, which is connected to the front wall structure and to the longitudinal girder. The longitudinal girder and the reinforcement element are preferably situated at least partially overlapping or overlaying one another in a connection section located in front of the front wall structure in the travel direction or vehicle longitudinal direction, viewed in the vehicle transverse direction, and is also directly connected to one another in this connection section.

The reinforcement element is at least regionally situated inside the front wall structure in this case and directly connected to an inwardly curved wheel housing section, for example, which can be implemented both as a separate component and also integrally with a front wall plate extending essentially in the vehicle transverse direction. The reinforcement element protrudes at least sectionally in front of the front wall structure and is directly structurally connected in this area to the longitudinal girder of a front frame, which extends essentially in the vehicle longitudinal direction.

In that the longitudinal girder and the reinforcement element are directly connected to one another in a way partially overlapping or overlaying one another located in front of the front wall structure, and in that each connection or overlap section has an orientation which has at least one directional component in the vehicle longitudinal direction and therefore an overlay or overlap of longitudinal girder and reinforcement element is provided viewed in the vehicle transverse direction, optionally also in the vehicle vertical direction, upon occurrence of a force acting in the vehicle longitudinal direction, an improved structural and torsional stiffness can be provided in the attachment area of front longitudinal girder and front wall structure.

Because the reinforcement element extends located in front of the front wall structure, at least having one directional component in the vehicle longitudinal direction, external forces and in particular forces acting from the front in the vehicle longitudinal direction can be introduced into the reinforcement element essentially in the longitudinal direction. Furthermore, a structure-weakening bend of the reinforcement element can advantageously be avoided by the implementation of the reinforcement element protruding in front of the front wall structure, so that because of its altered geometry, it can be implemented as thinner-walled and therefore to save weight and material in comparison to known embodiments.

The reinforcement element can still have a curvature or bend, any possible radii of bending or curvature in the immediate attachment area are to be implemented as greater than approximately 10 cm, preferably greater than approximately 20 cm, however. For example, it is provided according to an advantageous embodiment that the reinforcement element is implemented as a reinforcement plate having an essentially C-shaped cross-section. Furthermore, it can be provided in this case that the reinforcement element also has multiple cross-sectional profiles implemented as C-shaped per se. The lateral legs of the C-cross-sectional profile preferably extend essentially horizontally in the installed position of the reinforcement element and the base section of the C-profile connecting the two legs to one another extends essentially in the vertical direction.

Attachment flanges are preferably provided adjoining the lateral profile legs, which are used for fastening the reinforcement element to the vehicle body components provided in the front wall area. The reinforcement element is closed to form a hollow profile by attachment to the vehicle body components provided in the area of the front wall structure.

According to an embodiment, it is provided that the reinforcement element and the longitudinal girder have cross-sectional profiles open toward one side and corresponding to one another at least in the area of their connection section. It is provided in particular in this case that longitudinal girder and reinforcement element have cross-sectional profile sections which at least regionally adjoin one another and are preferably connected to one another in a friction-locked or materially-bonded manner.

Furthermore, it has proven to be advantageous if the reinforcement element and the longitudinal girder are supported on one another in the area of a profile section extending essentially vertically and/or in the area of a profile section extending essentially horizontally. An interleaved arrangement can thus be provided of reinforcement element and longitudinal girder, which both have a cross-section implemented at least regionally like a C-profile.

Furthermore, it can be provided that the longitudinal girder and the reinforcement element are structurally connected to one another along an essentially horizontally oriented profile leg and along the essentially vertically running profile base, the other essentially horizontally running profile leg of the reinforcement element coming to rest at a distance to the complementarily or correspondingly implemented profile leg of the longitudinal girder. If a structural distance is maintained, relatively simple installation can be performed even in the event of comparatively large component tolerances.

Furthermore, it is provided according to a further embodiment that the essentially C-shaped reinforcement element is situated nearly completely inside the longitudinal girder profile implemented correspondingly thereto in the connection section. With such an interleaved arrangement of longitudinal girder and reinforcement element, a comparatively large reciprocal contact surface of longitudinal girder and reinforcement element can be achieved, which can have an advantageous effect on the structural stiffness of the connection section.

Furthermore, it is provided in this case that the profiles of the longitudinal girder and the reinforcement element which are situated in one another are jointly closed by a closing plate at least in the area of their connection section. The closing plate contributes to further increasing the structural and torsional stiffness.

Furthermore, it is provided that the material doubling in the connection area, which is formed by longitudinal girder and reinforcement element, has an orientation which extends in at least one directional component in the travel direction of the vehicle. The material doubling preferably extends essentially in the vehicle longitudinal direction. However, it can also extend diagonally to the travel direction or vehicle longitudinal direction at an angle of up to approximately 30° or even approximately 45°. Through this orientation of the connection section, an overlap or overlay of reinforcement element and longitudinal girder can be provided in the vehicle transverse direction.

Furthermore, it is provided according to a further embodiment that the reinforcement element, starting from its attachment to the longitudinal girder and opposite to the travel direction, extends outward or correspondingly curves outward viewed in the vehicle transverse direction. In particular, it can be provided in this case that the closing plate which closes the connection section of longitudinal girder and reinforcement element merges integrally into an inwardly curved wheel housing plate, and the reinforcement element extends on the inside, facing toward the passenger compartment, along the wheel housing plate, and is optionally also directly connected thereto in this area.

It is accordingly provided in particular according to a refinement that the reinforcement element curves outward corresponding to the contour of a wheel housing section of the front wall in the vehicle transverse direction and is optionally directly connected to the wheel housing section via edge-side attachment flanges.

Furthermore, it is provided according to an embodiment of the invention that the front wall structure has a front wall crossbeam connected to the reinforcement element and a front wall plate. The front wall crossbeam preferably extends in this case between a left reinforcement element and a right reinforcement element, which, in a substantially symmetrical design, each structurally reinforce the left connection section and right connection section of a left front longitudinal girder and right front longitudinal girder, respectively, on the front wall crossbeam.

Furthermore, it has proven to be advantageous if, according to a further embodiment, an end section of the reinforcement element facing away from the front longitudinal girder directly adjoins a lateral front wall section and/or a side sill and/or is directly connected to these vehicle body components.

Furthermore, it is provided according to a further embodiment that an end section of the front wall crossbeam lying in the vehicle transverse direction is directly connected to the reinforcement element. For this purpose, the front wall crossbeam can have a correspondingly implemented fastening flange approximately adapted to the curvature of the reinforcement element, for example.

The front wall plate is preferably fastened on the front wall crossbeam and can also be directly connected to the reinforcement element in this case. Furthermore, the front wall structure can have a lateral front wall plate adjoining the side sill and laterally adjoining the wheel housing, for example, which can also be connected to an end section of the reinforcement element facing away from the front longitudinal girder. The reinforcement element therefore preferably extends from a connection section of the front longitudinal girder lying in front of the vehicle front wall continuously up to the lateral front wall and/or up to the inner sill structure, which is preferably fastened on the bottom, on the end section of the reinforcement element protruding outward in the vehicle transverse direction.

Furthermore, it is provided in a further embodiment that the reinforcement element, the longitudinal girder, the front wall plate, and/or the front wall crossbeam have a fastening flange on at least one edge section. By means of one such fastening flange, preferably by means of multiple fastening flanges, a suitable reciprocal contact surface can be provided for the reciprocal attachment and fastening of the mentioned vehicle body components, which allows welding, riveting, or clinching of the vehicle body components to be connected to one another.

It is also accordingly provided according to a further embodiment that the reinforcement element, the longitudinal girder, the front wall plate, and/or the front wall crossbeam, preferably also the side sill, are welded, riveted, and/or connected to one another by means of clinching in the area of their respective fastening flanges.

Finally, according to a further embodiment, a motor vehicle, preferably a passenger automobile, is provided that has an above-described motor vehicle body.

BRIEF DESCRIPTION OF THE FIGURES

The present invention will hereinafter be described in conjunction with the following drawing figures, wherein like numerals denote like elements, and:

Fig. shows a perspective view of a front wall area of a motor vehicle body viewed from the vehicle interior;

FIG. 5 shows a further embodiment of the reinforcement element in a perspective corresponding to FIG. 4;

FIG. 6 shows a cross-section in the x-y plane along section line B-B according to FIG. 2; and FIG. 7 shows a vertical cross-section through the connection section of longitudinal girder and reinforcement element along section line C-C according to FIG. 3.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
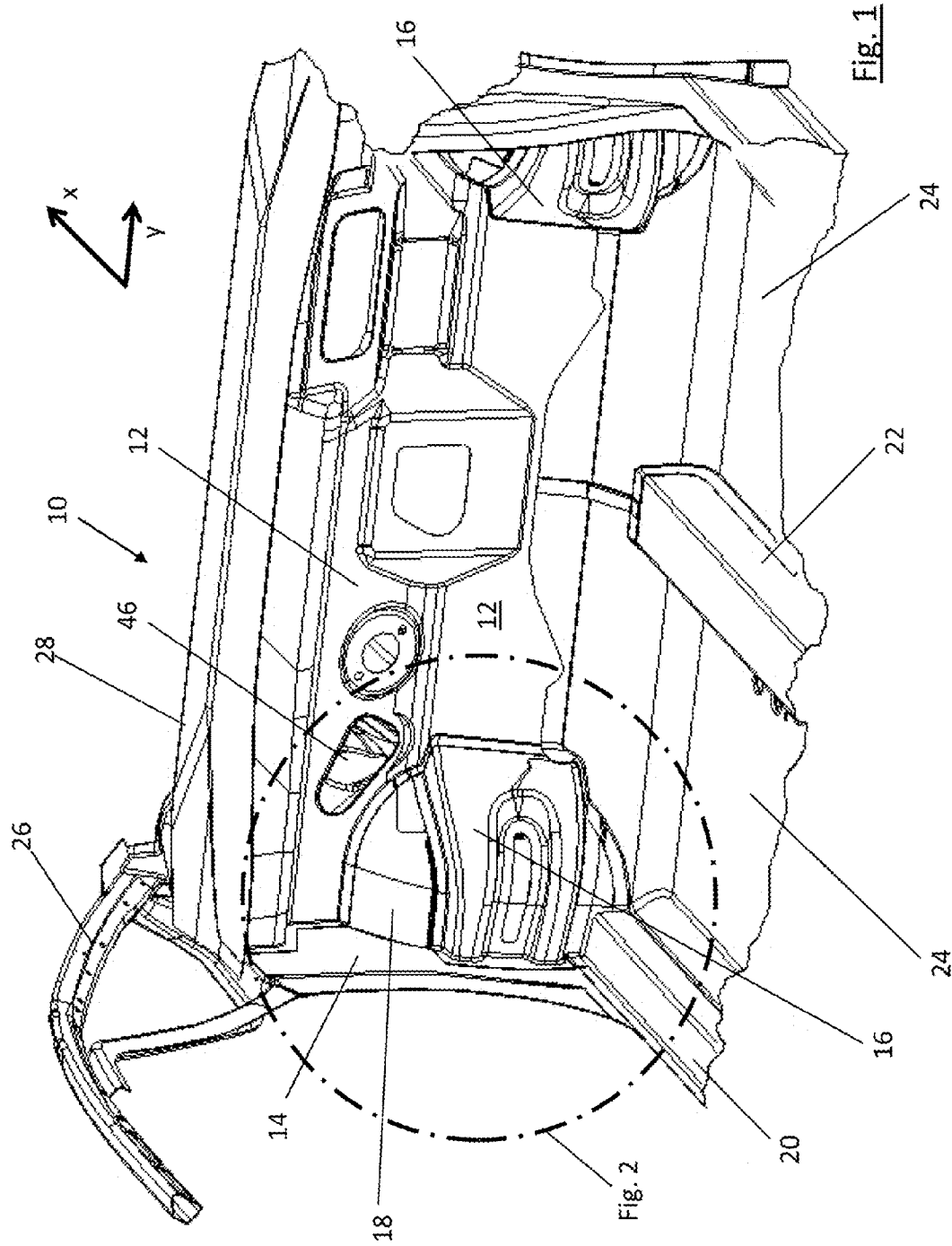
Figure 2:
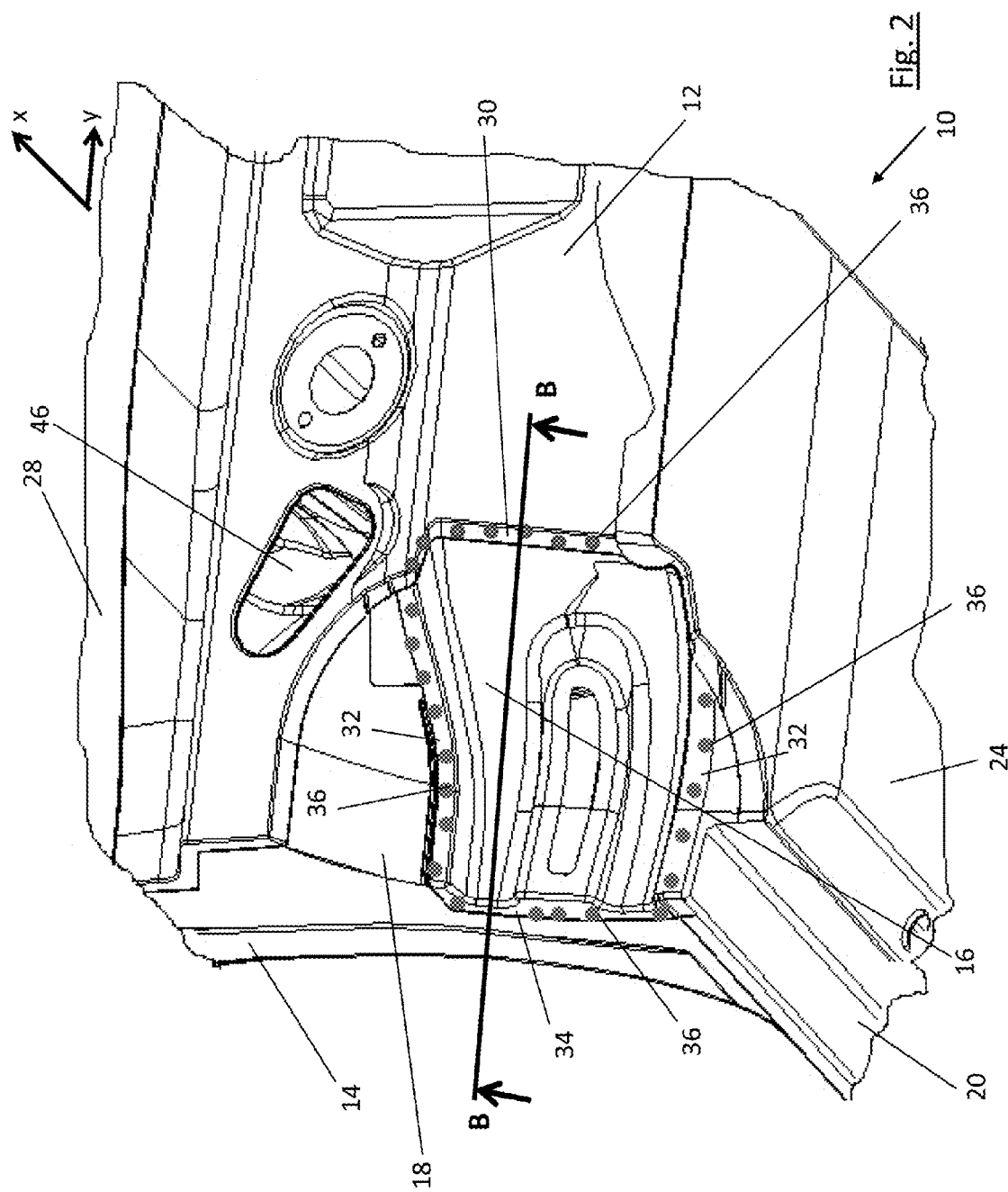
FIG. 2 shows an enlarged view of the left reinforcement element according to FIG. 1.

FIG. 1 and FIG. 2 show a motor vehicle front wall arrangement 10 of a motor vehicle body viewed from the interior of the motor vehicle. The front wall arrangement 10 has a front wall plate 12, which extends between two lateral wheel housing sections 18, each implemented as curved inward. A floor plate 24 and a central tunnel 22 are provided at the bottom, adjoining the front wall 12.

An inner side sill 20 extends adjoining the front wall 12 and adjoining the floor plates 24 opposite to the travel direction in the vehicle longitudinal direction (x). Furthermore, a lateral front wall plate 14 and the A-column 26 and a windshield support 28 for the windshield are shown in FIG. 1. Furthermore, the front wall 12 is provided with a steering passage 46 for receiving a steering column.

In the area of the inwardly curved wheel housing plates 18, which may also be implemented integrally with the front wall plates 12, 14 lying above the fastening flange 32, for example, a reinforcement element 16 is situated inward, facing toward the passenger compartment, which has an end section adjoining the lateral front wall 14 extending to the left in FIG. 2 and is connected directly to the lateral front wall 14 by means of a corresponding fastening flange 34 via multiple spot welds 36.

Along a lower fastening flange section 32, the reinforcement element 16 is connected to both the interior side sill 20 and also to the wheel housing plate and optionally also to the adjoining floor plate 24. An upper fastening flange 32 extends substantially along the inwardly curved wheel housing 18. In the area of the wheel housing 18 shown in FIG. 2, the reinforcement element 16, viewed in the vertical direction, has two cross-sectional profiles implemented like C-profiles and spaced apart from one another in the vehicle vertical direction (z).

Toward the front, facing toward the front structure of the motor vehicle and the front wall plate 12 running in the vehicle transverse direction (y), the front wall plate 12 adjoining the reinforcement element 16 also has an edge-side fastening flange section 30. In this overlapping area, the front wall plate 12 is welded to the reinforcement element 16, for example, via the partially indicated spot welds 36.

Furthermore, as is obvious from FIG. 6, the reinforcement element 16 extends in an area lying in front of the front wall structure formed by front wall crossbeam 44 and front wall plate 12. In the connection section, which is shown on the left of the front wall structure 44, 12 in cross-section in FIG. 6, a front longitudinal girder 40 and the reinforcement plate 16 are directly connected to one another, for example, by welding, to form a material doubling shown in vertical cross-section in FIG. 7. The cross-sectional profiles of longitudinal girder 40 and reinforcement plate 16 are implemented approximately like C-profiles, which correspond to one another.

Furthermore, as shown for exemplary purposes in FIG. 7, the vertical cross-sectional profile sections of reinforcement plate 16 and longitudinal girder 40 and also an upper, essentially horizontally running profile section are directly connected to one another, adjoining one another over nearly the entire surface, by means of diverse spot welds 36. The material doubling formed by longitudinal girder 40 and reinforcement plate 16 is preferably oriented along the vehicle longitudinal direction (x). Overall, in the case of the C-profile-like cross-sections provided here of reinforcement plate 16 and front longitudinal girder 40, a material overlay or overlap results in the vehicle transverse direction (y) and/or the vehicle vertical direction (z).

Such an attachment proves to be particularly advantageous for absorbing and dissipating forces acting on the longitudinal girder 40 in the vehicle longitudinal direction. The reinforcement plate 16 also has a substantially harmonic extension opposite to the travel direction (x) and a contour free of buckle points.

As illustrated in FIG. 6, the reinforcement element 16 is curved outward in the vehicle transverse direction (y) opposite to the travel direction of the vehicle. It only follows the contour of the wheel housing plate 18. The bending radius is significantly greater than approximately 10 cm or even approximately 20 cm in this case. Through the avoidance of buckle points or bending radii of the reinforcement element 16 in the millimeter range or single-digit centimeter range, an overall improved structural and torsional stiffness of the front frame attachment can be achieved.

In the isolated and perspective view of the connection section of reinforcement plate 16 and front frame 40, it is recognizable that the two structural components, which are implemented like C-profiles per se, press against one another over nearly the entire surface and are situated interleaved in one another. Furthermore, as is obvious from the associated vertical cross-section according to FIG. 7, a substantially horizontally running upper profile section and a vertical profile section of the reinforcement plate 16 and the longitudinal girder 40 are welded to one another, while below, between the essentially horizontally running lower legs of the reinforcement plate 16 and the longitudinal girder 40, a free construction distance remains, which simplifies the reciprocal installation of longitudinal girder 40 and reinforcement plate and permits certain component tolerances during the installation and manufacturing of the sheet-metal parts.

The sheet-metal parts 40, 16, which are implemented as C-like and press substantially flatly against one another, and are shown in cross-section in FIG. 7, are closed by means of a shared closing plate 48. The closing plate 48, corresponding to the cross-sectional illustration according to FIG. 6, can even integrally adjoin the wheel housing plate 18 protruding inward into the passenger compartment. Furthermore, FIG. 6 shows that the reinforcement plate 16 is welded to the lateral front wall plate 14 using an external fastening flange 34 in the vehicle transverse direction (y).

Figure 3:
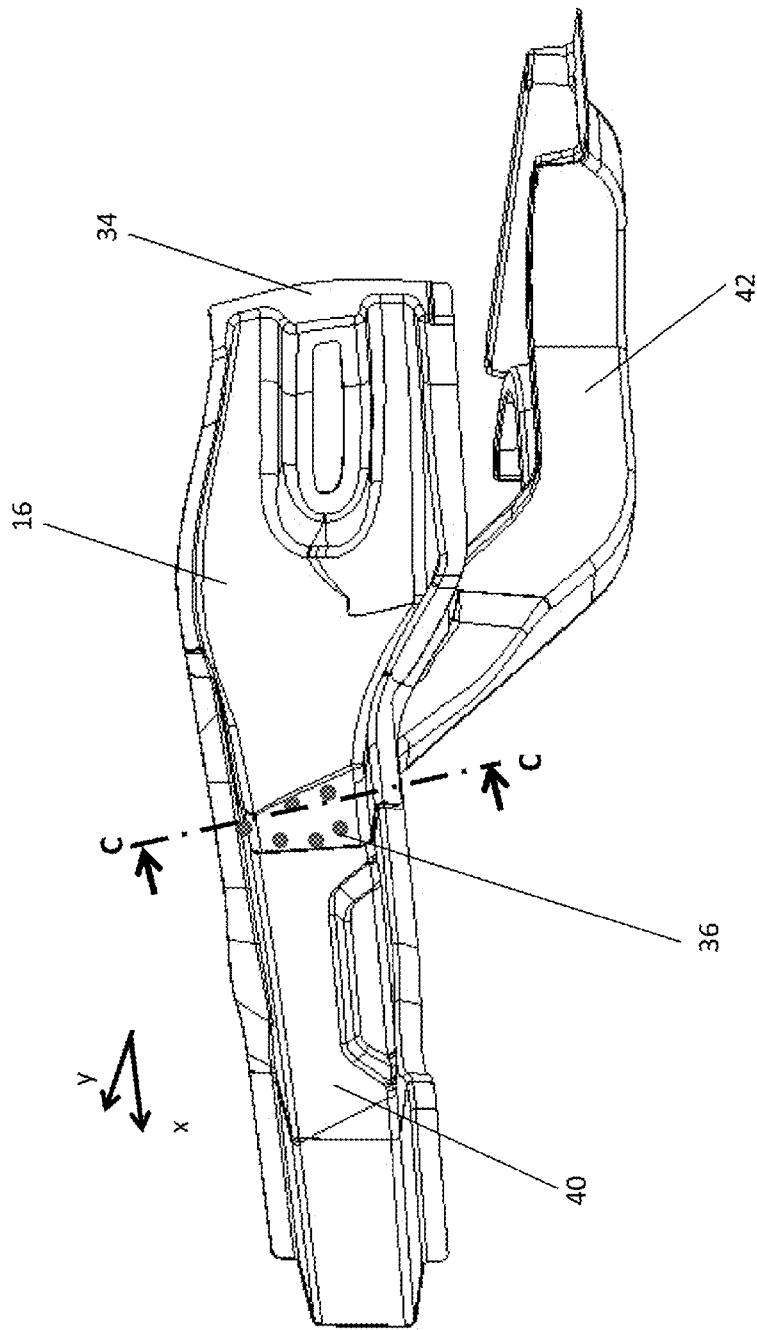
FIG. 3 shows an isolated perspective view of the front longitudinal girder, longitudinal girder extension, and reinforcement element in a side view.
Figure 4:
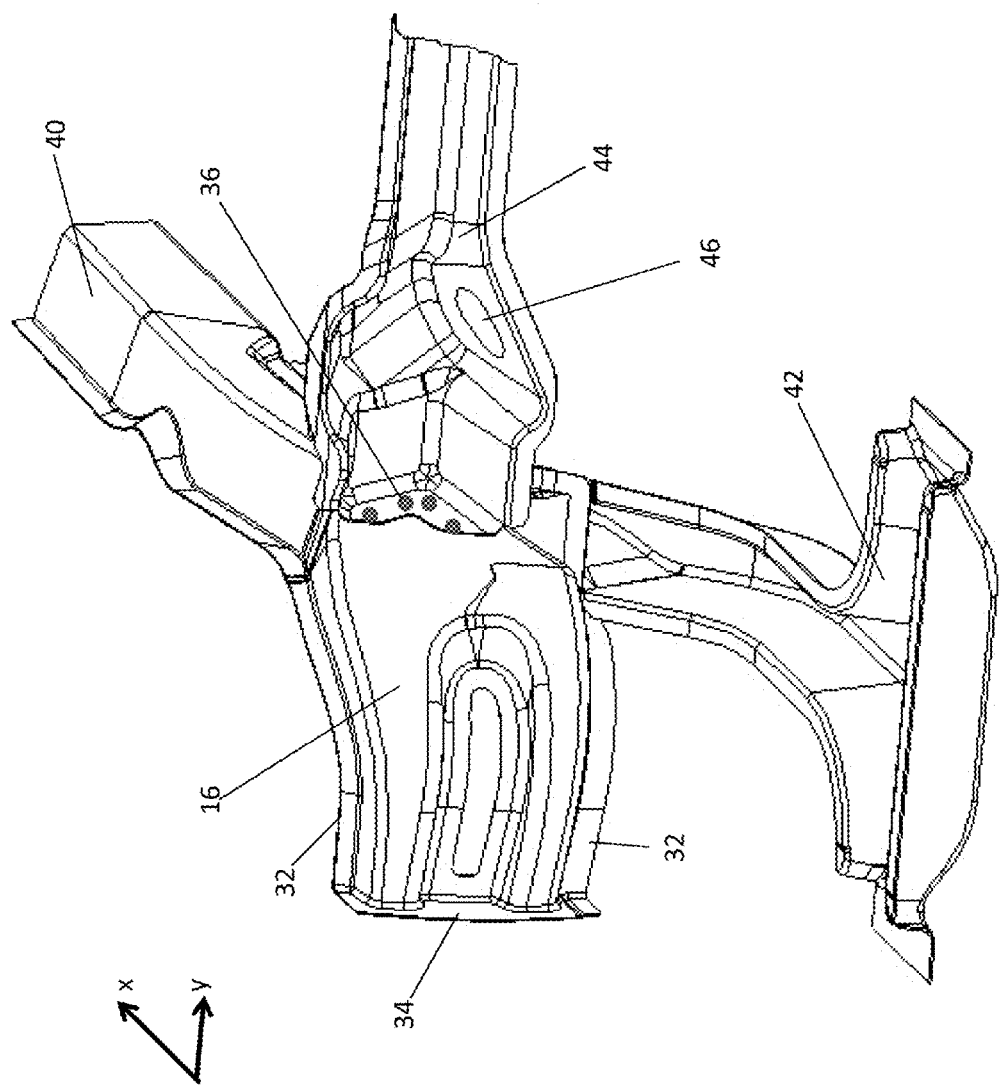
FIG. 4 shows a further view of the configuration shown in FIG. 3 in a perspective corresponding FIG. 1.

As is recognizable on the basis of FIG. 3, FIG. 4, and FIG. 5, the longitudinal girder 40, viewed opposite to the travel direction of the vehicle, merges into a front frame extension 42 running diagonally downward. The front frame extension 42 can be connected to the front longitudinal girder 40 as a separate component, or also integrally. The longitudinal girder 40 or the front frame extension 42 is supported on the reinforcement plate 16 in the transition area from longitudinal girder 40 to front frame extension 42.

The reinforcement element 16 thus forms a front frame support on the front wall structure, preferably on the front wall crossbeam 44 of the vehicle body. The fastening of the front wall crossbeam 44 on the reinforcement plate 16 is shown in FIG. 4 to FIG. 6, for example. The front wall crossbeam 44 comes to rest on the reinforcement plate 16 using a fastening flange implemented corresponding to the contour of the reinforcement plate 16 and is welded thereto there on the spot welds 36 shown as examples in FIG. 6. Furthermore, a steering passage 46 for receiving a steering column, which penetrates the front wall structure 12, 44, is shown in FIG. 1, FIG. 4, and FIG. 5.

In addition to the additional view of a floor plate 24 and a side sill 20, the embodiment according to FIG. 5 differs from the view according to FIG. 4 in that the reinforcement plate 38 has a continuous cross-section like a C-profile here, while in FIG. 4, beginning in the area of the inwardly curved wheel housing 18, it has a two-part C-shaped cross-sectional structure and is to be connected overall therein, viewed in the vehicle vertical direction, via four fastening flanges to the wheel housing plate 18.

With respect to installation, it is provided that the two left and right front frame arrangements, i.e., the already preconfigured reinforcement plates connected to the respective front frame 40, are connected to the lower front wall crossbeam 44 running in the vehicle transverse direction. The front wall crossbeam 44 is structurally connected in this case to an approximately vertically running wall of the reinforcement plate 16 functioning as the front frame support. After the connection of front longitudinal girders (40), reinforcement plates (16), and the front wall crossbeam (44), the vehicle front wall 12 is placed on the front frame rib structure thus formed and also structurally connected via the fastening flange sections 30 provided on the front wall 12 to the approximately vertical wall of the reinforcement plate 16.

Optionally, after the connection of the front frame support provided in this way to the vehicle front wall 12, in the further assembly sequence, the wheel housing 18 and later the lateral front wall 14, or the inner sill structure 20, can also be structurally connected to the reinforcement plate 16 or the front frame support structure formed thereby.

Using a front frame support by means of the described reinforcement plate, the contour of the front frame support, for example, viewed in horizontal projection from above, can run outward in the vehicle transverse direction (y), already lying in the profile of the front frame (40), and therefore can be guided past a motor vehicle interior area provided for receiving pedals without additional indentations, buckle points, or bending points. This embodiment of the reinforcement element (16), which regionally extends in front of the front wall structure and regionally extends into the vehicle interior, can have a particularly harmonic contour extension without structure-weakening buckle points or bending points, so that overall, improved structural stiffness or torsional stiffness of the vehicle body can be provided in case of a frontal impact. The possibility also results in this way of reducing the weight and also the material and manufacturing costs for a front frame attachment through sheet-metal thickness reduction.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body of a vehicle, comprising:
   a front wall structure;
   a lateral longitudinal girder that is situated at least regionally in front of the front wall structure in a travel direction of the vehicle and that has a first cross-sectional profile;
   a reinforcement element that is connected to the front wall structure and to the lateral longitudinal girder and that has a second cross-sectional profile, and
   a closing plate secured to the lateral longitudinal girder and the reinforcement element and that jointly closes the first cross-sectional profile and the second cross-sectional profile,
   wherein the lateral longitudinal girder and the reinforcement element are at least partially overlapping and directly connected to one another, viewed in a transverse direction of the vehicle, in a connection section in front of the front wall structure in the travel direction.

2. The motor vehicle body according to claim 1, wherein the reinforcement element is reinforcement plate having an essentially C-shaped cross-section, and wherein the reinforcement element is configured to curve outward in the transverse direction corresponding to a contour of a wheel housing section of the front wall structure.

3. The motor vehicle body according to claim 1, wherein the reinforcement element and the lateral longitudinal girder have cross-sectional profiles that are closed to a first, second, and third side and open to a fourth side and corresponding to one another in the first, second, and third sides at least in an area of the connection section.

4. The motor vehicle body according to claim 3, wherein the reinforcement element and the lateral longitudinal girder are configured to support one another in the area of an essentially vertically extending profile section.

5. The motor vehicle body according to claim 3, wherein the reinforcement element and the lateral longitudinal girder are configured to support one another in the area of an essentially horizontally extending profile section.

6. The motor vehicle body according to claim 1, wherein a cross-sectional profile of the lateral longitudinal girder is situated interleaved with the reinforcement element in the connection section and the lateral longitudinal girder and the reinforcement element are jointly closed by a closing plate.

7. The motor vehicle body according to claim 1, wherein the reinforcement member and the lateral longitudinal girder are substantially "C" shaped with first substantially horizontally oriented profile legs, second substantially horizontally oriented profile legs, and substantially vertically running profile bases in a cross-sectional profile, wherein the first substantially horizontally oriented profile legs are secured to each other, the substantially vertically running profile bases are secured to each other, and the second substantially horizontally oriented profile legs are separated from each other, and wherein the cross-sectional profile is closed by a closing plate disposed opposite the substantially vertically running profile bases.

8. The motor vehicle body according to claim 1, wherein a material doubling formed by the lateral longitudinal girder and the reinforcement element has an orientation that extends in at least one directional component in the travel direction of the vehicle.

9. The motor vehicle body according to claim 1, wherein the reinforcement element extends outward viewed in the transverse direction starting from an attachment to the lateral longitudinal girder opposite to the travel direction.

10. The motor vehicle body according to claim 1, wherein the front wall structure comprises a front wall crossbeam connected to the reinforcement element and a front wall plate.

11. The motor vehicle body according to claim 10, wherein an end section of the front wall crossbeam lying in the transverse direction of the vehicle is directly connected to the reinforcement element.

12. The motor vehicle body according to claim 10, wherein an end section of the reinforcement element facing away from the front wall structure directly adjoins a lateral front wall section.

13. The motor vehicle body according to claim 1, wherein the reinforcement element, the lateral longitudinal girder, a front wall plate, and a front wall crossbeam have a fastening flange on at least one edge section.

14. The motor vehicle body according to claim 13, wherein the reinforcement element, the lateral longitudinal girder, the front wall plate, and the front wall crossbeam are connected to one another in an area of the fastening flange.

* * * * *